United States Patent [19]
Diederich

[11] 3,869,135
[45] Mar. 4, 1975

[54] CONTROLLED LEAKAGE FACE TYPE SHAFT SEAL

[75] Inventor: Herbert Diederich, Frankenthal/Pfalz, Germany

[73] Assignee: KSB Kernkraftwerkspumen GmbH, Frankenthal, Germany

[22] Filed: Mar. 25, 1974

[21] Appl. No.: 454,411

[30] Foreign Application Priority Data
Mar. 27, 1973 Germany.......................... 2315190

[52] U.S. Cl. ............................................. 277/80
[51] Int. Cl. ............................................. F16j 9/00
[58] Field of Search ............................. 277/80-96

[56] References Cited
UNITED STATES PATENTS

| | | | |
|---|---|---|---|
| 2,843,403 | 7/1958 | Stevenson | 277/80 |
| 2,883,212 | 4/1959 | Laser | 277/80 |
| 2,913,289 | 11/1959 | Stevenson | 277/80 |
| 2,996,162 | 8/1961 | Lehde | 277/80 |
| 3,050,319 | 8/1962 | Colby | 277/80 |
| 3,137,237 | 6/1964 | Zagar et al | 277/80 |

Primary Examiner—Richard E. Aegerter
Assistant Examiner—Robert J. Smith
Attorney, Agent, or Firm—Michael S. Striker

[57] ABSTRACT

A hydrostatic seal wherein a shaft rotates in a stationary pump housing and carries a first sealing ring defining an annular gap with an axially movable second sealing ring in the housing. The gap permits controlled leakage of fluid from a pressure chamber into a low-pressure area adjacent to the periphery of the shaft. The second ring is urged toward the first ring by one or more weak springs, and the rings are surrounded by annular permanent magnets having similar poles adjacent to each other so that the magnets tend to move the second ring away from the first ring. The magnets become effective when the pressure of fluid in the chamber decreases to such an extent that the springs and/or gravity could reduce the width of the gap to zero. The magnets are encapsulated to avoid corrosion on contact with fluid in the pressure chamber.

10 Claims, 1 Drawing Figure

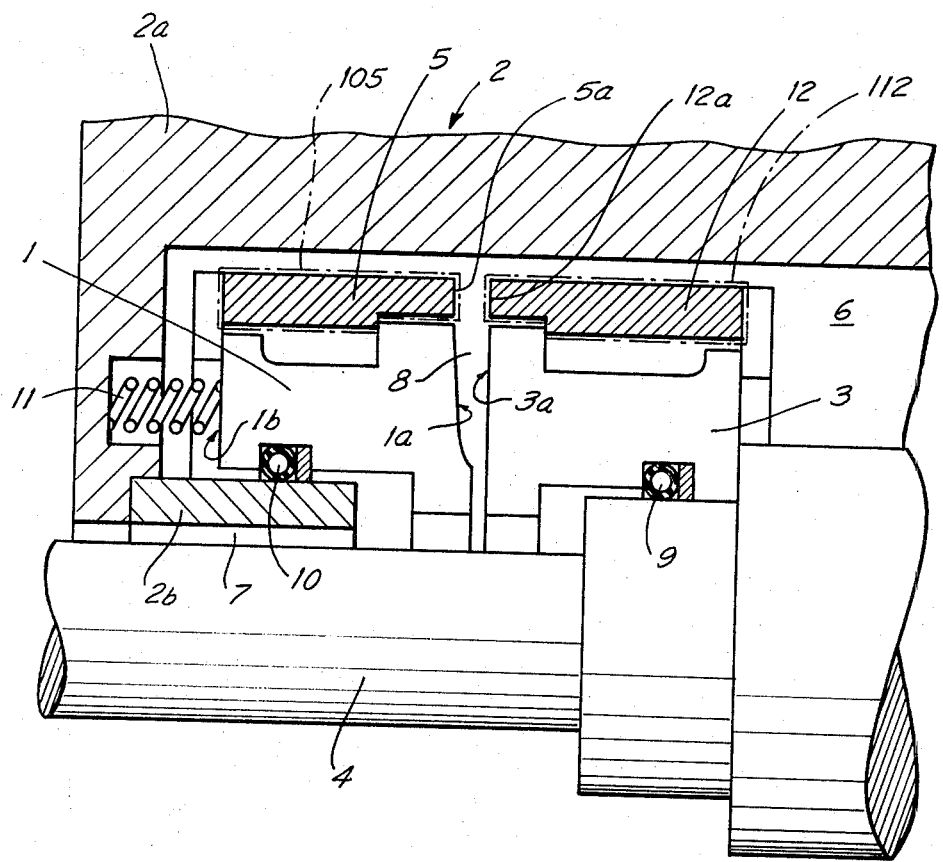

CONTROLLED LEAKAGE FACE TYPE SHAFT SEAL

BACKGROUND OF THE INVENTION

The present invention relates to hydrostatic seals in general, and more particuarly to fluid seal assemblies of the type known as controlled leakage face type shaft seals. Such seals can be used to permit controlled leakage of fluid from a pressure chamber into a low-pressure area, for example, in a centrifugal pump which is installed in a nuclear reactor plant. Reference may be had to German Printed Publication No. 1,650,061 of Sept. 4, 1969 and to the commonly owned copending application Ser. No. 353,133 filed Apr. 20, 1973 by Peter Stech.

The hydraulic forces which are necessary in a shaft seal to maintain the width of the gap between a first sealing ring which rotates with the shaft and a second sealing ring which is axially movable in but cannot rotate with respect to the housing depend on the difference between fluid pressure in the pressure chamber and that in a low-pressure area of the pump. If the difference is small or decreases to zero, the width of the gap between the sealing rings becomes unpredictable and normally tends to decrease so that the sealing rings actually touch each other. Such contact between the sealing rings will take place if the axially movable ring is located at a level above the other ring. A reduction of the width of the gap to zero is undesirable, especially during starting of the pump in a nuclear reactor plant, because the wear on the surfaces bounding the gap is very high. Attempts to avoid contact between the sealing rings during starting include the provision of means for raising the pressure of fluid in the high-pressure chamber before the shaft begins to rotate. This presents serious problems as concerns the energy and space requirements of the pump.

It was further proposed to employ hydraulic or mechanical springs which tend to move the sealing rings of a shaft seal away from each other so as to avoid a reduction of the width of the gap to zero when the fluid pressure in the high-pressure chamber decreases. Such proposal exhibits the drawback that the pump must be provided with a hydrodynamic seal downstream of the gap so as to seal the low-pressure area from the atmosphere while the pump is idle.

SUMMARY OF THE INVENTION

An object of the invention is to provide a novel and improved shaft seal wherein the sealing rings are held out of contact with each other during each stage of operation and in each condition of the machine or apparatus which embodies the seal.

Another object of the invention is to provide a shaft seal with novel and improved means for maintaining the sealing rings out of contact with each other when the difference between the pressure fluid in the pressure chamber and the pressure of fluid in the low-pressure area decreases to a value at which the fluid in the pressure chamber would be unable to hold the axially movable sealing ring out of contact with the other sealing ring.

A further object of the invention is to provide novel and improved sealing rings for use in controlled leakage face type shaft seals.

The invention is embodied in a fluid seal arrangement which comprises a shaft member, a housing member which spacedly surrounds the shaft member and defines therewith a fluid-containing pressure chamber and a low-pressure area adjacent to the peripheray of the shaft member, means for rotating one of the members (preferably the shaft member) about the axis of the shaft member, first and second sealing rings which are located in the pressure chamber and are respectively secured to the housing member and shaft member, means for guiding one of the sealing rings for movement axially of the shaft member, front surfaces provided on the two sealing rings and defining an annular gap for the leakage of fluid from the pressure chamber into the low-pressure area, a rear surface provided on the one sealing ring and facing away from the respective front surface, the fluid which is contained in the pressure chamber acting against the front and rear surfaces and thereby maintaining the width of the annular gap within a predetermined range as long as the pressure of fluid in the pressure chamber exceeds a preselected value, and first and second magnets respectively provided on the first and second rings and having similar poles adjacent to each other to urge the one ring away from the other ring and to thus prevent excessive reduction of the width of the gap when the pressure of fluid in the pressure chamber is less than the preselected value.

The novel features which are considered as characteristic of the invention are set forth in particular in the appended claims. The improved shaft seal itself, however, both as to its construction and its mode of operation, together with additonal features and advantages thereof, will be best understood upon perusal of the following detailed description of certain specific embodiments with reference to the accompanying drawing.

BRIEF DESCRIPTION OF THE DRAWING

The single FIGURE is a fragmentary axial sectional view of a controlled leakage face type shaft seal which embodies the invention.

DESCRIPTION OF THE PREFERRED EMBODIMENTS

The drawing shows a controlled leakage face type shaft seal wherein a pump shaft 4 rotates in a pump housing 2. The housing 2 has a main portion 2a which defines with the shaft 4 a fluid-containing pressure chamber 6, and a cylindrical second portion 2b which defines with the shaft 4 a low-pressure area 7.

The means for permitting a controlled leakage of fluid from the chamber 6 into the low-pressure area 7 comprises two sealing rings 1 and 3. The ring 3 is secured to and rotates with the shaft 4 (for example, the coupling between the ring 3 and shaft 4 may be of the type as disclosed and shown in the commonly owned copending application Ser. No. 353,133 filed Apr. 20, 1973 by Peter Stech) and defines with the ring 1 an annular gap 8 extending between the chamber 6 and low-pressure area 7. A gasket 9 is interposed between the ring 3 and shaft 4, and a similar gasket 10 is installed between the housing portion 2b and ring 1. The latter is movable axially of the shaft 4 and is biased toward the ring 3 by one or more helical springs 11. The ring 1 is held against rotating in the housing 2, preferably in a manner as disclosed in the aforementioned copending application of Stech. Fluid in the chamber 6 acts upon the front and rear surfaces 1a, 1b of the ring 1 to normally insure that the gap 8 allows for controlled leakage of fluid from the chamber 6 into the low-pressure area 7. The front surface 1a is located opposite a radially extending front surface 3a of the rotary ring 3.

In accordance with a feature of the invention, the ring 1 is provided with a first permanent magnet 5 which faces a second permanent magnet 12 on the ring 3. The adjacent poles of the magnets 5, 12 are similar and, therefore, the magnets tend to repel each other and to increase the width of the gap 8 between the front surface 1a of the ring 1 and the front surface 3a of the ring 3. The magnets 5 and 12 become effective as soon as the magnitude of hydraulic sealing forces decreases to such an extent that the spring or springs 11 (and/or the force of gravity if the pump is mounted in an upright position with the ring 1 located at a level above the ring 3) would be likely to reduce the width of the gap 8 to zero.

The magnets 5 and 12 are preferably annular and are preferably encapsulated in suitable sheaths or casings 105, 112 (indicated by phantom lines) to avoid corrosion in response to contact with hydraulic fluid in the chamber 6.

The purpose of the spring or springs 11 is to prevent excessive widening of the gap 8 when the pressure in the chamber 9 decreases below a preselected valve. These springs oppose the tendency of the magnets 5, 12 to increase the width of the gap 8 when the pump is idle and the pressure in the chamber 6 is low. The hydrostatic forces which act on the ring 1 when the pump is in use are large enough to establish an optimum width of the gap 8 irrespective of the tendency of magnets 5 and 12 to move the ring 1 axially and away from the ring 3. Thus, the repelling force of the magnets 5, 12 is negligible when the fluid in the chamber 6 is maintained at normal operating pressure. However, the repelling force of the magnets 5, 12 should suffice to overcome the tendency of one or more O-rings (each of the gaskets 9, 10 may include an O-ring) to move the ring 1 toward the ring 3. The repelling force of the magnets 5, 12 decreases in response to increasing width of the gap 8, and such force decreases at a rate which is much higher than the rate of increase in the distance between the neighboring poles of the magnets. The spring or springs 11 insure that the width of the gap 8 does not increase beyond a predetermined value when the pressure of fluid in the chamber 6 decreases so that the magnets 5 and 12 can push the ring 1 away from the ring 3.

The drawing shows that the axial length of the magnets 5, 12 equals or approximates the axial length of the respective rings 1, 3, that the right-hand surface 5a of the magnet 5 is flush with the outermost portion of the front surface 1a, and that the left-hand surface 12a of the magnet 12 is flush with the outer portion of the front surface 3a. The surface 1a has portions which are inclined with respect to the surface 3a so that the width of the corresponding portions of the gap 8 decreases in a direction toward the periphery of the shaft 4.

Without further analysis, the foregoing will so fully reveal the gist of the present invention that others can, by applying current knowledge, readily adapt it for various applications without omitting features which fairly constitute essential characteristics of the generic and specific aspects of my contriburion to the art and, therefore, such adaptations should and are intended to be comprehended within the meaning and range of equivalence of the claims.

What is claimed as new and desired to be protected by Letters Patent is set forth in the appended claims:

1. In a fluid seal arrangement, the combination of a shaft member; a housinng member spacedly surrounding said shaft member and defining therewith a fluid-containing pressure chamber and a low-pressure area adjacent to the periphery of said shaft member, one of said members being rotatable about the axis of said shaft member; first and second sealing rings coaxial with said shaft member, located in said chamber and respectively secured to said housing member and said shaft member, one of said rings being movable axially of said shaft member and said rings having neighboring front surfaces defining an annular gap for the leakage of fluid from said chamber into said area, said one ring further having a rear surface facing away from the respective front surface and being exposed to the pressure of fluid in said chamber whereby the fluid contained in said chamber and acting on said surfaces maintains the width of said gap within a predetermined range as long as the fluid pressure in said chamber exceeds a preselected value; and first and second magnets respectively provided on said first and second rings and having similar poles adjacent to each other to urge said one ring away from the other of said rings and to thus prevent excessive reduction of the width of said gap when the pressure of fluid in said chamber is less than said preselected value.

2. The combination of claim 1, further comprising means for biasing said one ring axially toward said other ring.

3. The combination of claim 1, wherein each of said magnets includes an annular permanent magnet.

4. The combination of claim 3, wherein said annular magnets surround the respective rings.

5. The combination of claim 3, further comprising means for sealing said magnets against contact with the fluid in said chamber.

6. The combination of claim 1, wherein each of said magnets has a surface flush with the front surface of the respective ring.

7. The combination of claim 1, wherein said magnets are located in said chamber.

8. The combination of claim 1, wherein said one sealing ring is said first ring and said one member is said shaft member.

9. The combination of claim 1, wherein at least a portion of one of said front surfaces is inclined with respect to the other of said front surfaces so that the width of the corresponding portion of said gap decreases in a direction toward the periphery of said shaft member.

10. The combination of claim 1, wherein each of said magnets is an annular permanent magnet which surrounds the respective ring, the axial length of each of said annular magnets being equal to or approximating the axial length of the respective rings.

* * * * *